United States Patent
Berkema

(10) Patent No.: US 6,185,632 B1
(45) Date of Patent: Feb. 6, 2001

(54) HIGH SPEED COMMUNICATION PROTOCOL FOR IEEE-1394 INCLUDING TRANSMISSION OF REQUEST AND REPLY WRITES TO A DATAGRAM_FIFO_ADDRESS TO EXCHANGE COMMANDS TO END A JOB

(75) Inventor: Alan Chris Berkema, Granite Bay, CA (US)

(73) Assignee: Hewlett-Packard Company, Palo Alto, CA (US)

( * ) Notice: Under 35 U.S.C. 154(b), the term of this patent shall be extended for 0 days.

(21) Appl. No.: 09/174,820

(22) Filed: Oct. 19, 1998

(51) Int. Cl.[7] .............................. G06F 13/00; G06F 13/14; G06F 13/28; G06F 9/00; G06F 9/44
(52) U.S. Cl. ........................ 710/20; 710/1; 710/5; 710/7; 710/14; 710/32; 710/61; 709/100; 712/225; 712/245; 714/707
(58) Field of Search .................................. 709/100, 101, 709/208; 710/1, 5, 7, 8, 11, 14, 20, 21, 29, 32, 33, 61; 713/1, 200, 202; 712/200, 201, 225, 245; 714/707

(56) References Cited

U.S. PATENT DOCUMENTS

| | | | |
|---|---|---|---|
| 5,815,678 | * | 9/1998 | Hoffman et al. ................ 395/309 |
| 5,948,136 | * | 9/1999 | Smyers ............................ 710/107 |
| 5,949,877 | * | 9/1999 | Traw et al. ........................ 380/4 |
| 5,987,126 | * | 11/1999 | Okuyama et al. ................ 380/5 |
| 5,991,520 | * | 11/1999 | Smyers et al. .................. 395/280 |
| 6,018,816 | * | 1/2000 | Tateyama ........................ 714/746 |
| 6,034,732 | * | 3/2000 | Hirota et al. .................... 348/441 |
| 6,038,625 | * | 3/2000 | Ogino et al. .................... 710/104 |
| 6,101,613 | * | 8/2000 | Garney et al. .................. 713/600 |

* cited by examiner

Primary Examiner—Thomas C. Lee
Assistant Examiner—Tanh Nguyen

(57) ABSTRACT

A method of transferring image data between an initiator device and a target device using a IEEE 1394 standard bus. The present invention combines management functions, command functions, and isochronous data transfer to achieve the transfer of image data. The present invention discovers a target configuration using IEEE 1394 reads of a target configuration read only memory space. As part of the management function, the present invention uses a modified asynchronous data transfer protocol to establish a connection between the initiator and the target. Next, the present invention uses command functions to begin a job to transfer image data over an isochronous channel. Also, the present invention uses asynchronous data transfer to exchange printer job language commands to end a job.

8 Claims, 6 Drawing Sheets

HIGH SPEED COMMUNICATION PROTOCOL FOR IEEE-1394 INCLUDING TRANSMISSION OF REQUEST AND REPLY WRITES TO A DATAGRAM_FIFO_ADDRESS TO EXCHANGE COMMANDS TO END A JOB

The present invention generally relates to communication protocols, and more specifically to a high speed image communication protocol using an IEEE 1394 bus. An IEEE 1394 standard, also known in industry as fire wire, describes a high speed serial bus that contains a 64 bit address space. The 1394 bus is a shared memory architecture, not a network or an I/O channel, and is incorporated herein by reference. The 64 bit address is divided into 16 bits for a node ID, e.g., a node number and bus number, and 48 bits for a memory space and command and status registers (CSR). The CSR allows read/write/lock operations used for asynchronous data communication that conforms to ISO 13213/IEEE 1212 CSR standard, which is incorporated herein by reference. Asynchronous communication is not guaranteed with respect to time, i.e., the user cannot determine when the data will transfer.

In addition to asynchronous communication, the IEEE 1394 serial bus provides for isochronous data communication. Isochronous communication guarantees both a latency, i.e., delay, and a bandwidth of data, with respect to time. For example, every 125 microseconds a data packet that matches a predetermined bandwidth in length, is transmitted to an isochronous channel. Importantly, unlike asynchronous data packets, isochronous data packets can be sent to hardware without microprocessor intervention.

While the IEEE 1394 standard offers both asynchronous and isochronous communication, no known protocols exist that take advantage of these features for communication of a link layer controller and a physical layer. Protocols provide a mechanism to enable communication between two or more devices, such as a copier, a printer, and a scanner. One such protocol is serial bus protocol 2 (SBP-2) only defines an asynchronous data transfer communication protocol. SBP-2, which is incorporated herein by reference, requires that an initiator login to a target to begin a communication. Basic building blocks of SBP-2 include operation request block (ORB) data structures. Two main types of ORBs are a command ORB and a management ORB. Additionally, SBP-2 describes services that operate on the command and management ORBs as fetch agents.

A problem exists since SBP-2's use of fetch agents is inefficient for some data transfers, such as requests and replies. For example, initially, the fetch agent must fetch the ORB to learn an address of data. After learning the data address, the fetch agent reads the data using 1394 read transactions. An initial device must manage the ORBs stored in a linked list. Thus, the initial device writes an address of a first ORB in the list to a doorbell register to inform a target device where to begin. When the ORB is completed, the target device writes a status back to the initial device's memory. Thus, the cost is high in terms of resources and time when sending only small packets of control data. Another problem with using SBP-2 is that SBP-2 does not specify a way to transfer isochronous data. Early versions of the standard did specify a means for isochronous data transfer, however, isochronous data transfer was removed due to the complexity.

Problems also exist with solutions such as an IEC 61883 standard function control protocol (FCP). FCP is typically used with audio/video devices for isochronous data transfer, however, it only handles point to point connections between two devices. Additionally, FCP, which defines command and response frames, can only be sent to a fixed address with a fixed length. Thus, commands and responses are overwritten when multiple devices or the same device write to the fixed address before information is processed. Other solutions include utilizing a small computer systems interface (SCSI) and an IEEE 1284 parallel port. The parallel port, however, falls short on performance and fails to offer isochronous data transfer. Additionally, SCSI lacks isochronous data transfer which is a key element in allowing for a low cost hardware transmission.

Accordingly, it is a primary object of the present invention to provide an improved method to enable communication between two or more devices.

Another object of the present invention is to provide an improved method for reducing high overhead of basic protocol functions such as requests and replies.

Yet another object of the present invention is to provide an improved method which allows for an isochronous data transfer.

Other objects and advantages will become apparent upon reading the following detailed description, in conjunction with the attached drawings, in which.

TABLE OF ACRONYMS

This patent utilizes several acronyms. The following table is provided to aid the reader in determining the meaning of the several acronyms:

CPU=central processing unit.
CSR=command and status register.
EOJ=end of job.
FCP=function control protocol.
FIFO=first in/first out.
ID=identification.
IEEE=Institute for Electrical and Electronics Engineers.
I/O=input/output.
ISO=International Standards Organization.
MTU=maximum transmission unit.
ORB=operation request blocks.
PJL=printer job language.
ROM=read only memory.
SBP-2=serial bus protocol 2.
SCSI=small computer systems interface.

DETAILED DESCRIPTION

Broadly stated, the present invention is directed to an improved communication protocol method for communication between selected initiator and target devices, for example. More specifically, the present invention is a method of transferring image data between such an initiator device and a target device using a IEEE 1394 standard bus. The present invention discovers a target configuration using IEEE 1394 reads of a target configuration read only memory space. As part of a management function, the present invention uses a modified asynchronous data transfer protocol to establish a connection between the initiator and the target. Next, the present invention uses command functions to begin a job to transfer image data over an isochronous channel. Also, the present invention uses asynchronous data transfer to exchange printer job language commands to end a job.

Figure 1:
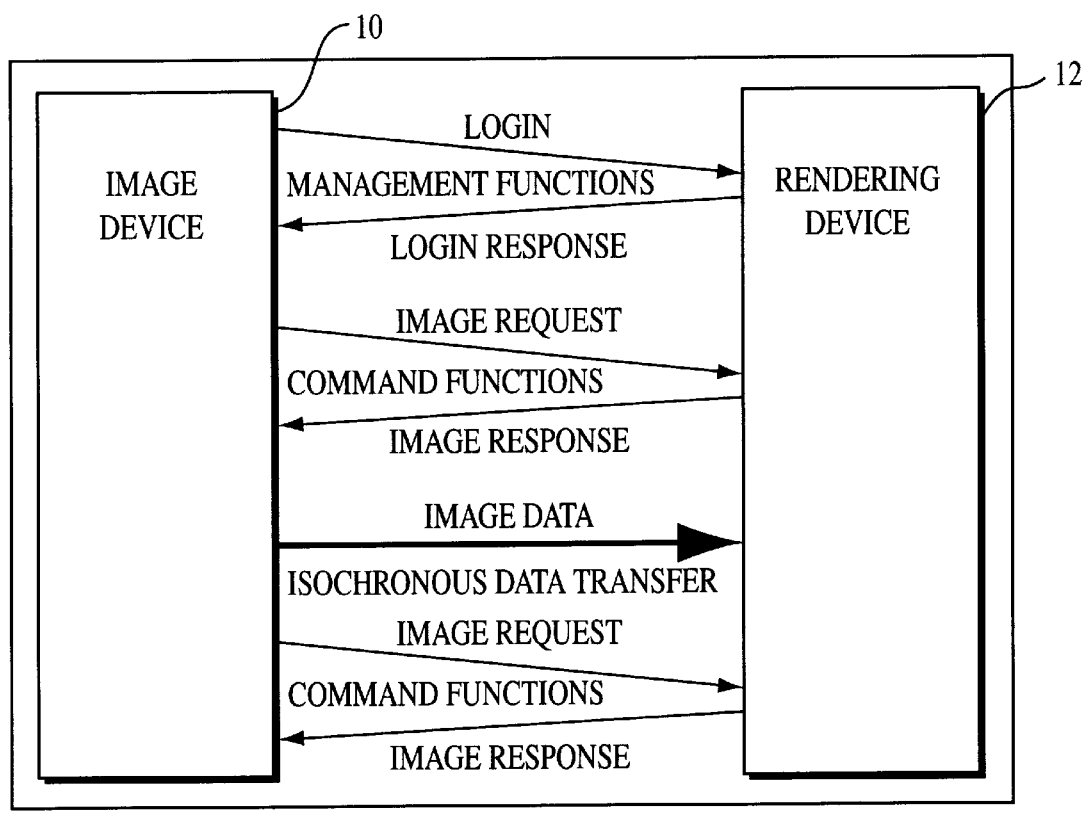
FIG. 1 is an overview of three functions embodying the present invention.

Turning now to the drawings, and particularly FIG. 1, a high speed image communication protocol of the present invention provides three major features: management functions; command functions; and isochronous data transfer. The three features utilize the IEEE 1394 bus to enable communication between an image device 10, such as a copier, image creation device, or raster image processing device, and an image rendering device 12, such as a printer. A device that originates management functions is referred to as an initiator, and a device that responds to management functions is referred to as a target. In a preferred embodiment of the present invention, the image device 10 originates management functions and, thus is the initiator. Accordingly, the rendering device 12 is the target.

Figure 2:
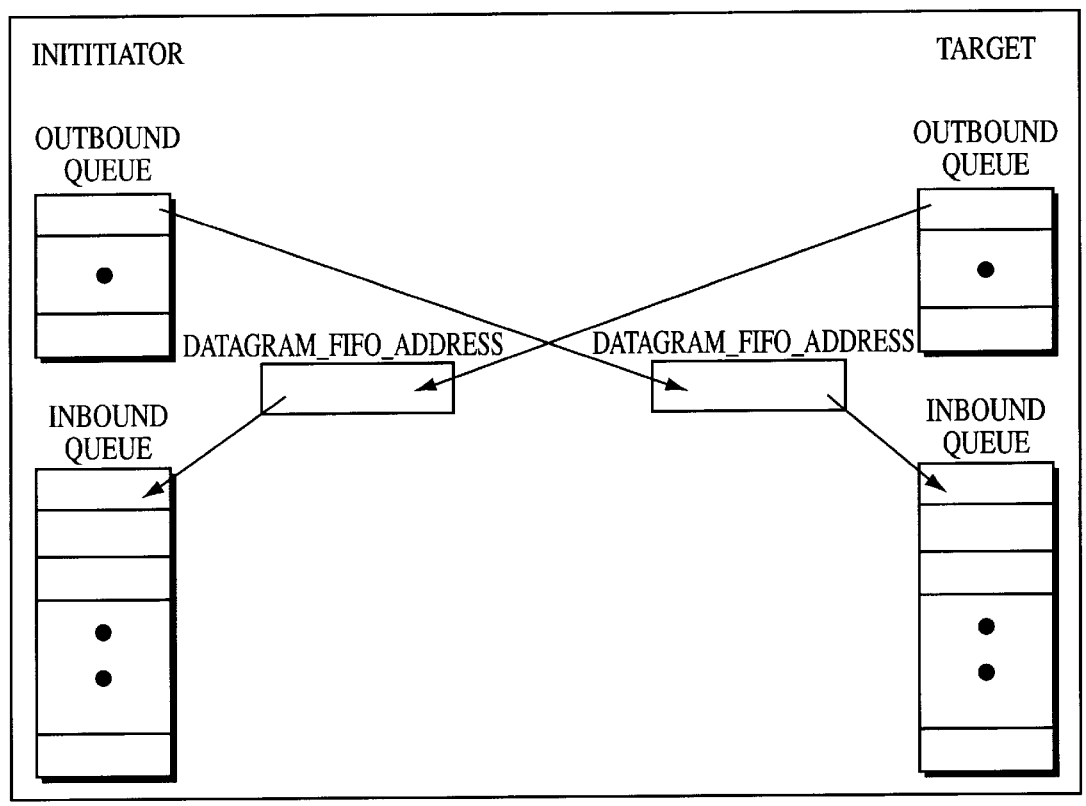
FIG. 2 is a diagram of an asynchronous datagram transmission.

Referring to FIG. 2, both the initiator and the target include an outbound queue, and an inbound queue. The queues are lines of task or data. Queue entries are allocated to allow for maximum transmission unit (MTU) sized packets. The actual memory addresses used to store the queue entries is implementation dependent. The queue entries are allocated to allow an MTU size packet. The speed of the IEEE 1394 connection determines a size of the packets, i.e., the MTU. In addition to the inbound and outbound queues, both the initiator and the target include a datagram_FIFO_ address. The datagram_FIFO_address is a self-contained packet, rather than a stream of packets. Importantly, by employing the datagram_FIFO_address, the present invention reduces overhead and unintentional overwrites that accompany other known protocols.

Figure 3:
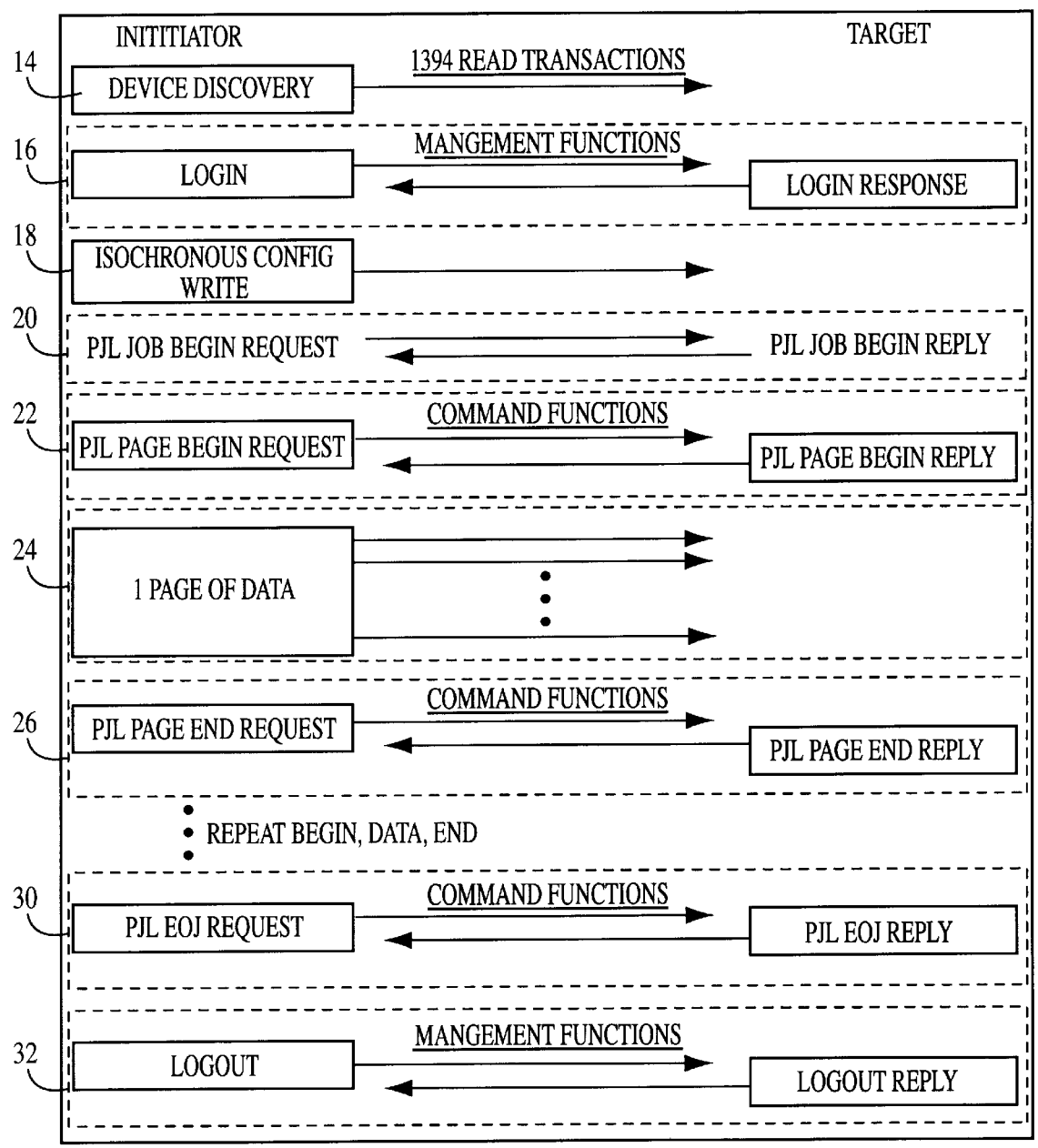
FIG. 3 is a diagram of the protocol method embodying the present invention.
Figure 4:
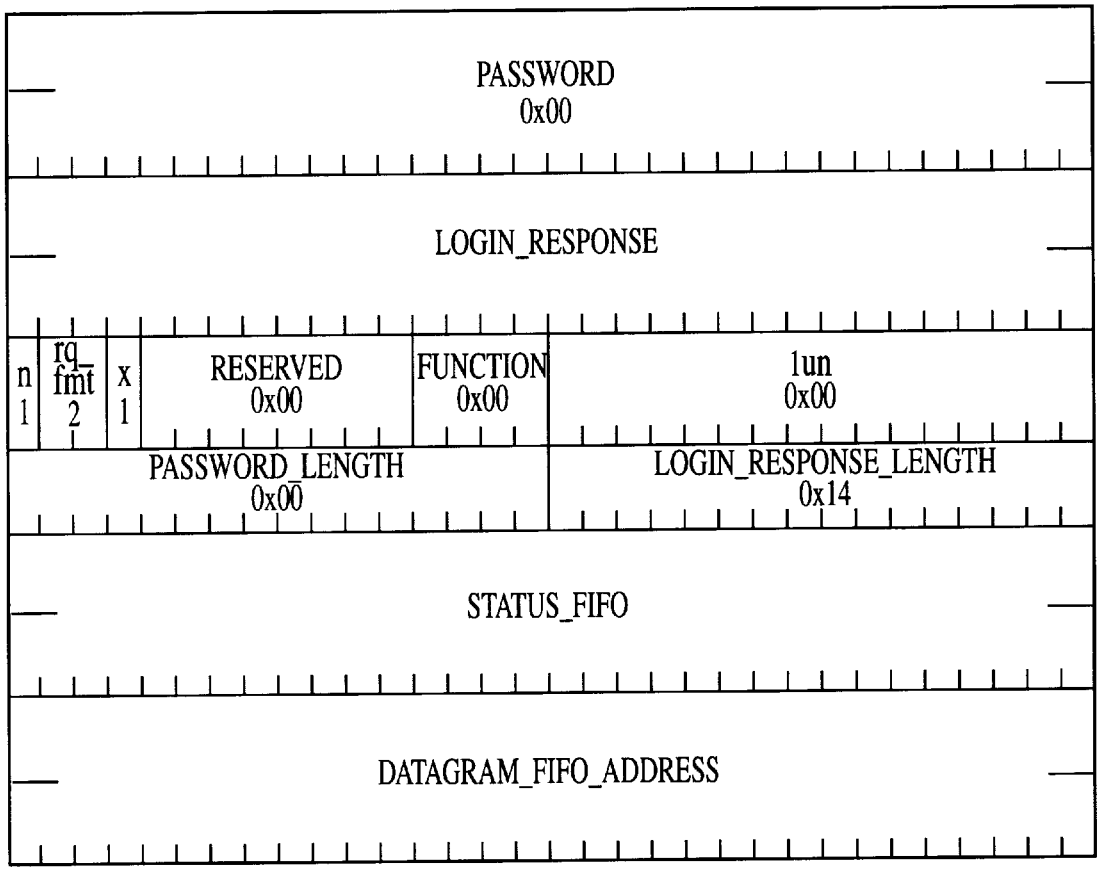
FIG. 4 is a diagram of a login operation request block.

Referring to FIG. 3, the initiator discovers the target using IEEE 1394 reads of the target's configuration read only memory (ROM) space (block 14). Upon discovering the target device, the initiator performs an asynchronous SBP-2 type Login using a Login ORB to establish a connection with the target (block 16). The Login ORB corresponds to the initiator outbound queue, as shown in FIG. 2. Importantly, however, the present invention adds the datagram FIFO_address field to fields described in the SBP-2 method, as shown in FIG. 4.

Figure 5:
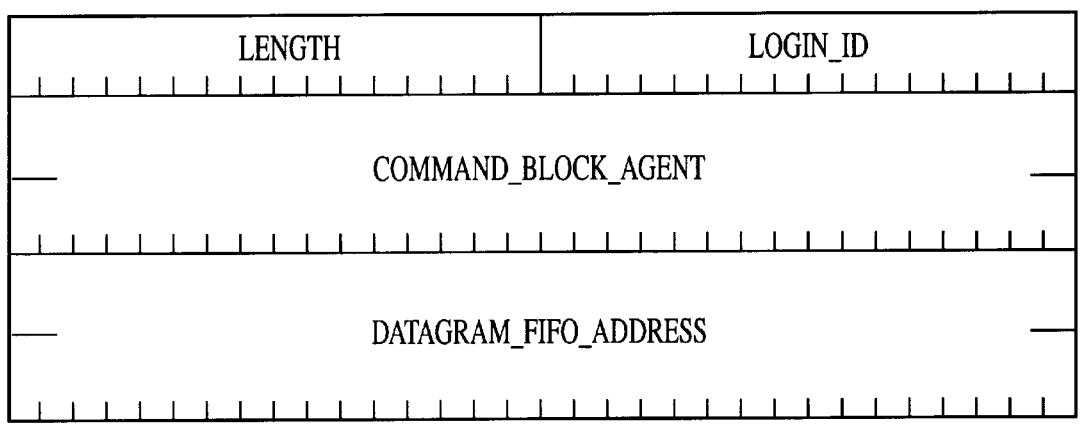
FIG. 5 is a diagram of a login response operation request block.

Returning to FIG. 3, the target replies with a Login Response (block 16). The Login response ORB corresponds to the target outbound queue, as shown in FIG. 2. Referring to FIG. 5, the Login Response ORB follows the method described in SBP-2 by utilizing a length, a login_ID, and a command_block agent field. The command_block agent field is an address that points to a Unit Command_Block_ Agent Control and Status Register (CSR) on the target's ROM. For example, for a single Login, the command_ block_agent field contains the address OxFFFF F001 0008. Moreover, like the Login ORB, the present invention adds the datagram_FIFO_address field to the standard SBP-2 Login Response ORB fields. Thus, during the management operation, the present invention exchanges the datagram_ FIFO_address between the initiator and the target.

Figure 6:
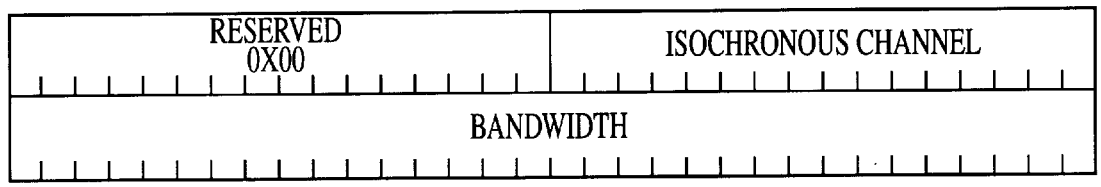
FIG. 6 is a diagram of an isochronous plug register.

Returning again to FIG. 3, following the initiator Login and target Login Response, the initiator allocates an isochronous channel and bandwidth using IEEE 1394 methods. Bandwidth includes the total number of bytes of a IEEE 1394 header and a payload cyclic redundancy check (CRC). Next, the initiator communicates isochronous configuration information by writing the negotiated bandwidth and channel values to an isochronous plug register (block 18). Referring to FIG. 6, the isochronous plug register provides a simple way to communicate isochronous channel and bandwidth information that the initiator negotiates. A target's configuration ROM address space following the SBP-2 command block agent CSR stores the isochronous plug register. The use of the isochronous plug register facilitates an isochronous data transmission referred to below.

Referring again to FIG. 3, after performing the isochronous configuration write, the initiator begins command functions by performing a printer job language (PJL) job begin request (block 20). Like the management functions, the command function use asynchronous SBP-2 data transfer to exchange control data between the initiator and the target. Unlike SBP-2, however, IEEE 1394 write transactions accomplish the initiator's request. The write transactions are addressed to the datagram_FIFO_address that was exchanged between the initiator and the target during the Login operation. Likewise, the target responds with a PJL job begin reply addressed to the datagram_FIFO_address (block 20).

Importantly, since the present invention uses the datagram_FIFO_address when transferring command data, SBP-2 fetch agents are not required, thereby reducing an otherwise required amount transactions between the initiator and the target. In turn, the present invention requires less bandwidth on the IEEE 1394 bus than known protocols such as SBP-2. Additionally, by eliminating the need for fetch agents, the present invention reduces memory overhead and requires less CPU power, which reduces the cost of the hardware implementation.

After receiving the PJL job begin reply, the initiator transmits a PJL page begin request to the datagram_FIFO_ address and the target sends a PJL page begin reply to the initiator (block 22). Again, use of the datagram_FIFO_ address conserves bus bandwidth, memory overhead, and CPU power.

After receiving the PJL page begin reply, the initiator uses the IEEE 1394 isochronous channel negotiated earlier to exchange a page of image data with the target (block 24). Importantly, use of the isochronous data transmission allows the initiator to stream image data packets to hardware without microprocessor intervention.

After the initiator sends the page of data to the target, the initiator writes to the datagram_FIFO_address to transmit a PJL page end request to the target and the target writes to the datagram_FIFO_address to respond with a PJL page end reply (block 26). If the initiator needs to send a next page of data, the initiator and the target exchange PJL page begin request/reply, the initiator sends the next page of data to the target, and the initiator and the target exchange PJL page end request/reply.

When the initiator contains no more pages of data to send to the target, the initiator writes to the datagram_FIFO_ address to send a PJL end of job (EOJ) request to the target (block 30). Thereafter, the target writes to the datagram FIFO_address to respond with a PJL EOJ reply. The initiator performs a SBP-2 logout management function to end the connection between the initiator and the target (block 32).

From the foregoing description, it should be understood that an improved communication protocol has been shown and described which has many desirable attributes and advantages. The present invention is able to provide an improved protocol method to combine management functions, command functions, and isochronous data transfer to form a simple yet powerful mechanism to transfer large images while minimizing the cost of the implementation. Additionally, the present invention reduces firmware and processor intervention on the separate management and command channels, and achieves high performance by allowing for hardware image transfer on the isochronous channel. Further, since an SBP-2 fetch engine is not needed, the present invention requires less memory and central processing unit (CPU) power. Requiring less memory and CPU power reduces the cost of hardware.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A method of transferring data between an initiator device and a target device using a IEEE 1394 standard bus, said method comprising the steps of:

reading a target configuration of a read only memory space with IEEE 1394 standard reads;

establishing a connection between the initiator device and the target device using an asynchronous data transfer protocol;

transferring data using an isochronous data transfer protocol;

transmitting request and reply writes to an address to exchange commands to end a job; and ending said connection using said asynchronous data transfer protocol.

2. The method as defined in claim 1 wherein said steps of establishing a connection includes performing serial bus protocol 2 Login and Login Response operations.

3. The method as defined in claim 1 wherein said address is a datagram_FIFO_address.

4. The method as defined in claim 1 wherein said asynchronous data transfer protocol is a serial bus protocol 2.

5. The method as defined in claim 1 wherein said steps of ending the connection includes performing a serial bus protocol 2 Logout function.

6. The method as defined in claim 1 wherein said isochronous data transfer operation further includes the steps of:

transmitting request and reply writes to said address to exchange commands to start a page;

transferring a page of data with an isochronous data transfer protocol;

transmitting request and reply writes to said address to exchange commands to end a page; and repeating the above steps until a job ends.

7. The method as defined in claim 6 wherein said address is a datagram_FIFO_address.

8. A method of transferring preselected data between an initiator device and a target device using a IEEE 1394 bus, said method comprising the steps of:

(a) reading a target configuration of a read only memory space with IEEE 1394 standard reads;

(b) establishing a connection with a modified asynchronous data transfer protocol;

(c) exchanging printer job language commands to start a job with a datagram-based protocol;

(d) transmitting request and reply writes to an address to exchange commands to start a page;

(e) transferring a page of data with an isochronous data transfer protocol;

(f) transmitting request and reply writes to said address to exchange commands to end a page;

(g) repeating steps (d), (e), and (f) until said preselected data is transferred;

(h) transmitting request and reply writes to said address to exchange commands to end a job; and (i) ending said connection with said asynchronous data transfer protocol.

* * * * *